UNITED STATES PATENT OFFICE.

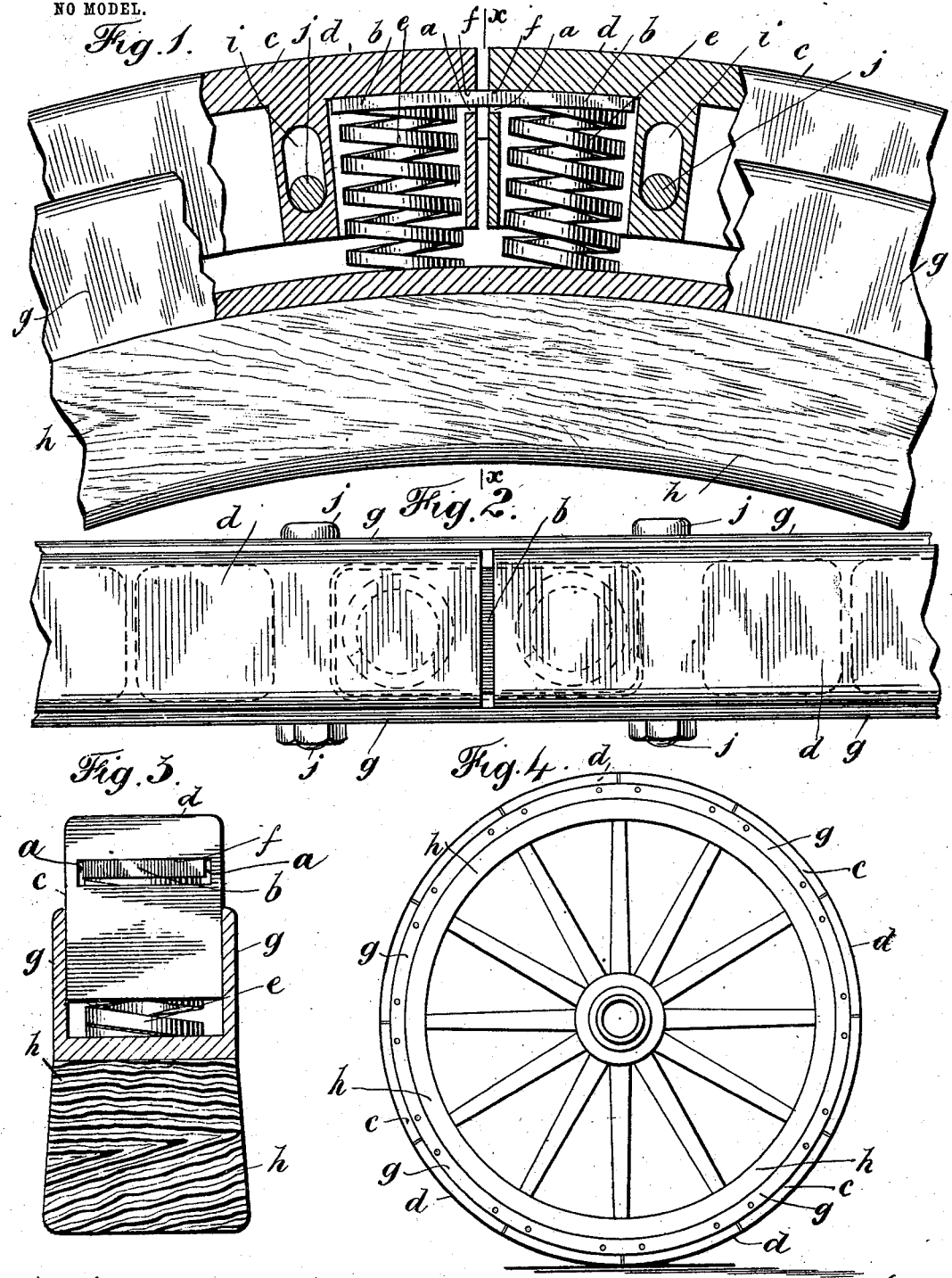

HAZELWOOD CARMONT, OF KINGSTON-UPON-THAMES, ENGLAND.

RESILIENT TIRE FOR WHEELS.

SPECIFICATION forming part of Letters Patent No. 724,259, dated March 31, 1903.

Application filed December 31, 1902. Serial No. 137,325. (No model.)

*To all whom it may concern:*

Be it known that I, HAZELWOOD CARMONT, a subject of the King of Great Britain, residing at "Helmsdale," Kingston-upon-Thames, county of Surrey, England, have invented certain new and useful Improvements in Resilient Tires for Wheels of Road-Vehicles, of which the following is a specification.

This invention relates to an improvement in that class of tires for wheels of road-vehicles in which metallic segments are held within a channeled rim, rubber, metallic, or other springs being arranged between the segments and rim.

My invention will be clearly understood from the following description, aided by the example shown on the annexed drawings, in which—

Figure 1 is a side elevation, partly in section, of a portion of a rim and tire of a wheel. Fig. 2 is a plan of a portion of a rim and tire of a wheel. Fig. 3 is an end elevation through the line $x\ x$ of Fig. 1. Fig. 4 is an elevation of a wheel.

In wheels in which the tires are formed of spring-controlled segments it has been found that the weight of the vehicle only acts upon one segment at a time, and in consequence such segment becomes depressed, leaving the next approaching one standing out in its normal condition, and a knocking noise is created by reason of the projecting end of the segment striking the ground previous to taking the weight of the load, besides doing great harm to the ends of the segments and to the springs. Now the object of my invention is to obviate this disadvantage and cause the neighboring segments to the one bearing the load to assist in bearing the load and at the same time become compressed, so as to present a smooth-surface edge for the onward travel of the wheel instead of a step-like surface, as is usual.

The drawings indicate my invention as applied to segments having boxes for retaining the springs, so that they do not become displaced during use.

For the purpose of my invention I cut in the ends of each segment a slot $a$ for receiving a plate $b$, which when the segments $c$ are placed end to end have a position some little distance in each segment and is situate between the segment-tread $d$ and springs $e$, arranged in the segments. By this means when the load is being borne by one segment the plate $b$ will act upon the wall $f$ and spring $e$ of the opposite segment on each side and take them down with it, so as to take part of the weight of the load and at the same time insure a smooth surface of the tread $d$ for the onward travel of the wheel.

The segments $c$ are made U shape in cross-section and have a position in U-shaped channel-iron $g$, fixed to the felly $h$ of the wheel, and such segments $c$ are provided with slots $i$, through which and the walls of the channel-iron $g$ bolts $j$ can be passed to secure the segments to the rim $g$.

Although in the drawings I have shown metallic springs in the segments, it is to be understood I may employ rubber springs.

What I claim, and desire to secure by Letters Patent, is—

1. A vehicle-tire including a plurality of segments, and yieldingly-mounted plates bridging the segments and bearing against the inner surfaces thereof.

2. A vehicle-tire including a channeled iron, segments fitted in the channel of the iron, plates bridging the segments and bearing against the inner faces thereof, and springs acting against the bottom of said channeled iron and opposite ends of the plates, respectively.

In testimony whereof I have hereunto set my hand in presence of two subscribing witnesses.

HAZELWOOD CARMONT.

Witnesses:
PERCY E. MATTOCKS,
FRED. C. SMITH.